US006036219A

United States Patent [19]

Oefelein et al.

[11] Patent Number: 6,036,219

[45] Date of Patent: Mar. 14, 2000

[54] EXPANDABLE TRANSPORT CART

[75] Inventors: Carl F. Oefelein, Barrington; David Wm. Beebe, Crystal Lake; Craig B. Doetzel, Barrington, all of Ill.

[73] Assignee: EZ Lode, Inc., Crystal Lake, Ill.

[21] Appl. No.: 09/039,544

[22] Filed: Mar. 16, 1998

[51] Int. Cl.[7] .......... B62B 3/02

[52] U.S. Cl. .......... 280/638; 280/35; 280/651; 280/47.35

[58] Field of Search .......... 280/638, 35, 651, 280/47.34, 47.35, 79.11, 79.3; 211/189, 175, 43, 60.1

[56] References Cited

U.S. PATENT DOCUMENTS

| | | | |
|---|---|---|---|
| 1,368,619 | 2/1921 | Fleury | 280/35 |
| 1,419,160 | 6/1922 | McKinnon | 280/638 |
| 1,608,419 | 11/1926 | Peacock | 280/35 |
| 2,472,952 | 6/1949 | Lennard | 280/79.11 |
| 2,718,404 | 9/1955 | Barskey | 280/34 |
| 2,885,090 | 5/1959 | Forman et al. | 280/35 |
| 3,104,890 | 9/1963 | Hill | 280/34 |
| 3,215,401 | 11/1965 | Grabarski | 280/35 |
| 3,278,042 | 10/1966 | Frydenberg | 280/35 |
| 3,400,942 | 9/1968 | Hull | 280/35 |
| 3,782,748 | 1/1974 | Poland | 280/35 |
| 3,937,485 | 2/1976 | Shourek et al. | 280/35 |
| 4,247,130 | 1/1981 | Paterson | 280/654 |
| 5,033,758 | 7/1991 | Levy | 280/35 |
| 5,090,725 | 2/1992 | Feldner | 280/651 |
| 5,228,716 | 7/1993 | Dahl | 280/651 |
| 5,249,823 | 10/1993 | McCoy et al. | 280/656 |
| 5,556,118 | 9/1996 | Kern et al. | 280/47.16 |
| 5,584,399 | 12/1996 | King | 211/41.15 |
| 5,875,652 | 3/1999 | Davis | 280/651 |
| 5,875,904 | 3/1999 | Vorstenbosch | 211/180 |

*Primary Examiner*—Paul N. Dickson
*Assistant Examiner*—Bridget Avery
*Attorney, Agent, or Firm*—Lee, Mann, Smith, McWilliams, Sweeney & Ohlson

[57] ABSTRACT

An expandable cart for transporting products. The cart is comprised of a plurality of parallel, telescoping tube assemblies, with the tube assemblies being mounted in header blocks for proper orientation of the tubes of the tube assemblies. The cart is mounted on a series of wheels and includes removable handles at either end for facilitating manipulation of the cart. Flexible containment sides extend around the handles for retaining products on the cart.

17 Claims, 4 Drawing Sheets

EXPANDABLE TRANSPORT CART

BACKGROUND OF THE INVENITON

This invention relates to carts for transporting products, and in particular to an expandable cart with removable handles and containment sides which can be readily raised or lowered, providing the cart with considerable versatility.

Various types of carts for transporting of products have been utilized for probably so long as the utility of the wheel has been recognized. In many arenas where intensive handling of products is common, such as in a mail handling facility, it is imperative that carts be provided that are versatile in use, and capable of being stored out of the way so as not to impede the orderly flow of packages through the facility.

Various types of carts have been developed in the past. For example, U.S. Pat. No. 5,228,716 discloses a convertible transport cart which, although expandable and convertible, is incapable of handling small products or packages, which can fall directly through its open framework structure. Its handles, although foldable, are not removable and the wheel assemblies extend beyond the framework of the cart, posing potential hazards when used in a crowded environment.

U.S. Pat. No. 2,718,404 is directed to a somewhat similar structure in that the cart is expandable and utilizes telescoping side frame members. For handling smaller objects, the cart has a series of removable cross slate that must be added or removed each time the cart is expanded or contracted. This, therefore, results in a very cumbersome change in the dimensions of the cart, and additional cross slats must be stored elsewhere to accommodate the expansion and contraction of the cart.

U.S. Pat. No. 3,104,890 discloses yet another utility cart having telescoping frame members to permit expansion and contraction. Its handles are not removable, and nothing is provided for handling of smaller objects which would otherwise drop through the open framework and impede movement of the cart. Straps are provided for holding the cart together and retaining objects in the cart, but no side structure of any kind is provided.

U.S. Pat. No. 1,419,160 discloses a cart which is expandable in its length dimension, and can handle small objects because it has a solid support structure. It does not have handles and its sides are minimal and cannot be adjusted in height dimension.

While prior art efforts at providing versatile carts have been marginally successful, the prior has not provided a cart which is readily expandable, does not require extra parts, has sides which can be easily raised or lowered, or even removed, to accommodate the load in the cart, or handles which are removable to facilitate storage, such as in an under-counter orientation. The present invention solves all of the deficiencies of the prior art, and more.

SUMMARY OF THE INVENTION

The invention is directed to an expandable cart, comprising a plurality of parallel, telescoping tube assemblies. Each of the tube assemblies comprises a major tube and a minor tube with the minor tube telescopically extending within the major tube. A pair of the tube assemblies constitute both opposite sides and part of the supporting surface of the cart, and at least one further tube assembly is provided, comprising a central support located between the opposite sides. Means is provided for maintaining the major tubes in a spaced relationship. Means is also provided for maintaining the minor tubes in a spaced relationship with the minor tubes in registration with the major tubes. A series of wheels is provided, mounted beneath the tube assemblies, with the wheels supporting the cart and providing mobility. Means is also provided for facilitating movement of the cart.

In accordance with the preferred form of the invention, the cart includes flexible containment sides. Four corner posts are provided, and the flexible containment sides preferably comprise a material panel which extends about the corner posts. Means is provided for mounting the material panel about the corner posts, that mounting means including a retainer strap with the material panel being suspended from the retainer strap. The retainer strap is adjustable as the cart is expanded or contracted.

In accordance with the preferred form of the invention, the means maintaining the major tubes in a spaced relationship comprises a pair of end headers. The major tubes are appropriately secured in the end headers, and a portion of the series of wheels is mounted on and beneath the end headers. Similarly, the means maintaining the minor tubes in a spaced relationship comprises a single end header, with the minor tubes being secured in the single end header and having free ends extending into the major tubes. A portion of the series of wheels is preferably also mounted on and beneath the single end header.

The means for facilitating movement of the cart comprises a removable handle assembly at each end of the cart. Each handle assembly includes two receptacles at each end of the cart and a removable handle extending upwardly from the receptacles. Each receptacle alone, or in combination with a portion of the handle, comprises one of the corner posts for mounting of the flexible containment sides.

Means is provided for retaining the tube assemblies at a plurality of telescopic extensions. In accordance with the disclosed form of the invention, the retaining means comprises a first radial aperture through at least one of the major tubes at one end thereof, and a series of spaced second radial apertures through the minor tube that extends from that major tube. A removable pin is provided for passing through the radial apertures of the major tube and the minor tube when they are in registration.

As explained above, the expandable cart according to the invention includes at least three of the parallel tube assemblies, one at either side and a central tube assembly therebetween. In accordance with the preferred form of the invention, at least five of the parallel tube assemblies are provided for properly supporting and carrying products. The number of tube assemblies will vary depending on the dimensions and use of the expandable cart.

BRIEF DESCRIPTION OF THE DRAWINGS

The invention is described in greater detail in the following description of examples embodying the best mode of the invention, taken in conjunction with the drawing figures, in which.

DESCRIPTION OF EXAMPLES EMBODYING THE BEST MODE OF THE INVENTION

Figure 1:
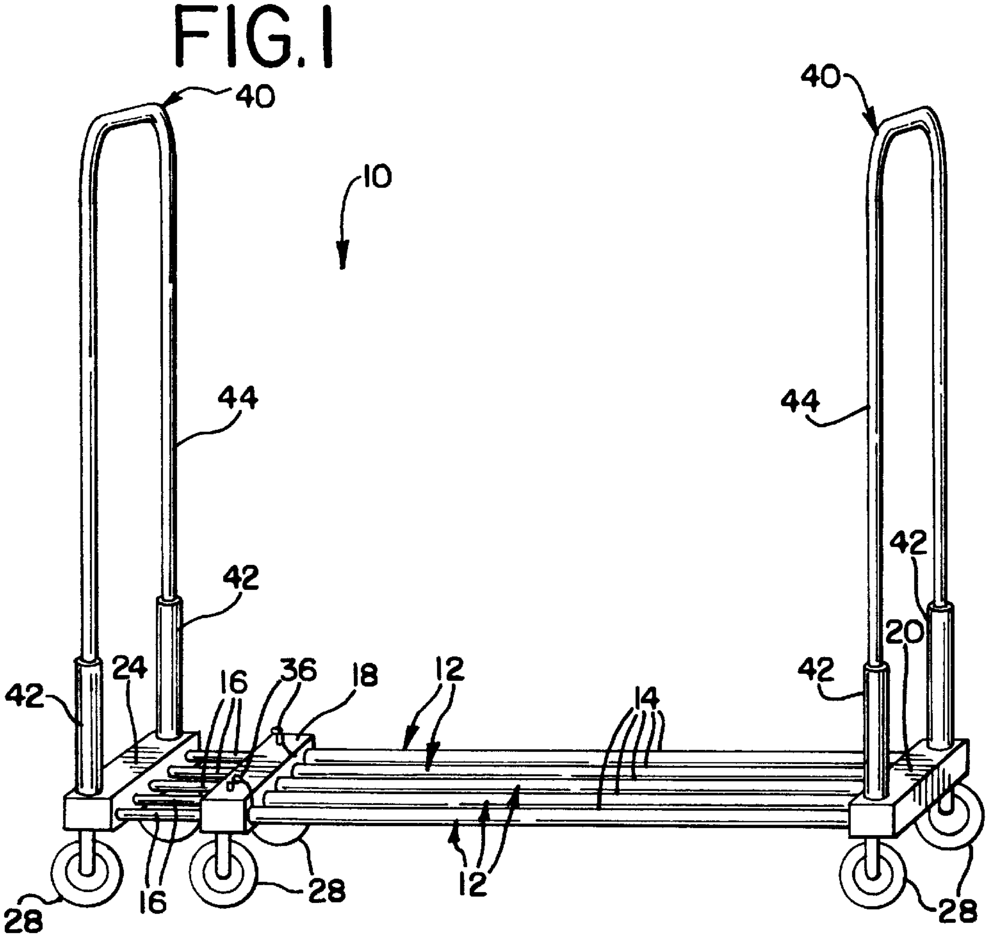
FIG. 1 is a perspective view of an expandable cart according to the invention, with the flexible containment sides removed to illustrate detail.

An expandable cart according to the invention is shown generally at 10 in the drawing figures. The cart 10 is comprised of a plurality of telescoping tube assemblies 12, each comprising a major tube 14 and a minor tube 16 with the minor tube 16 telescopically extending within the major tube 14. In the preferred forms of the invention illustrated in the drawing figures, five of the telescoping tube assemblies 12 are employed, with outboard tube assemblies 12 on either side of the expandable cart 10 comprising opposite sides of the cart. The middle three tube assemblies 12 comprise an intermediate support located between the opposite sides, with all five tube assemblies 12 comprising a supporting surface for products, packages or anything else to be transported by the cart 10.

Figure 11:
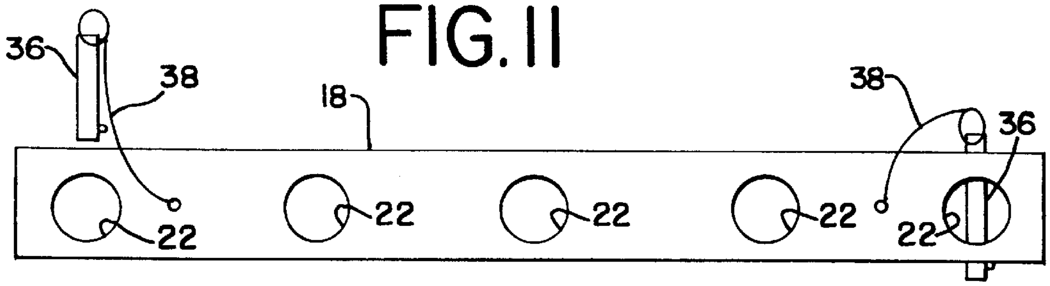
FIG. 11 is a side elevational view thereof, showing engagement of one of the removable pins through the header block.
Figure 12:
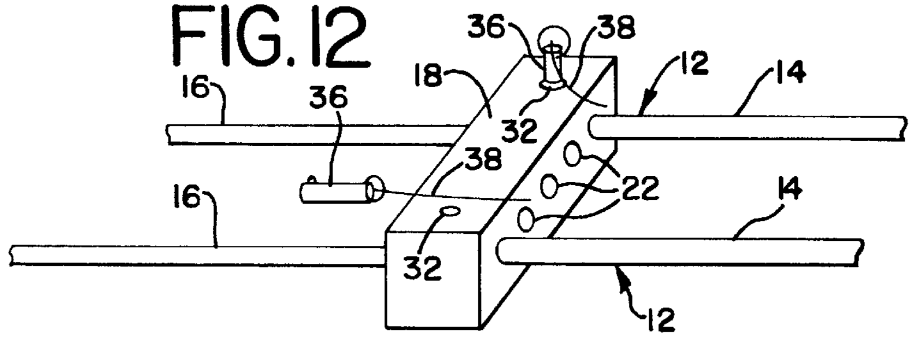
FIG. 12 is a reduced size perspective view of the header block of FIGS. 9 through 11, with the opposite side tube assemblies in place, one of the removable pins inserted, and the other tube assemblies omitted for simplicity.
Figure 13:
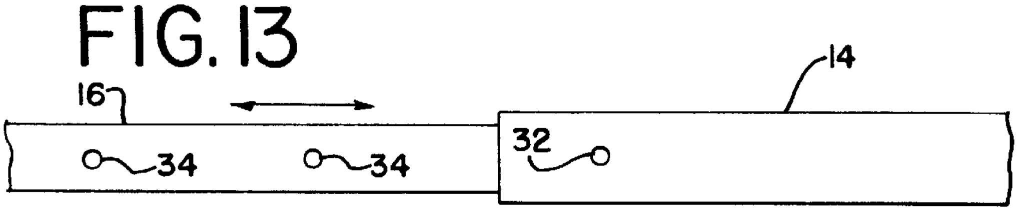
FIG. 13 is an enlarged fragmentary side elevational illustration of one of the tube assemblies, showing the telescoping feature and with the header block omitted to illustrate detail.

The five major tubes 14 are maintained in a spaced relationship by means of a pair of end headers 18 and 20. The tubes 14 are permanently installed within the headers 18 and 20 in any conventional fashion, and therefore the installation is not described in greater detail. The end header 18, as best shown in FIG. 11, has a series of bores 22 extending therethrough to accommodate the major tubes 14, while the end header 20 need not have bores completely therethrough since there is no necessity of passing anything through the end header 20.

Similarly, the minor tubes 16 are maintained in a spaced relationship by means of an end header 24. As illustrated, the end header 24 retains the minor tubes 16 in registration with the major tubes 14 so that the minor tubes 16 can telescope into and out of the major tubes 14. Similar to the end header 20, the minor tubes 16 are installed in bores 26 which need not extend completely through the end header 24 since nothing need pass therethrough.

Figure 10:
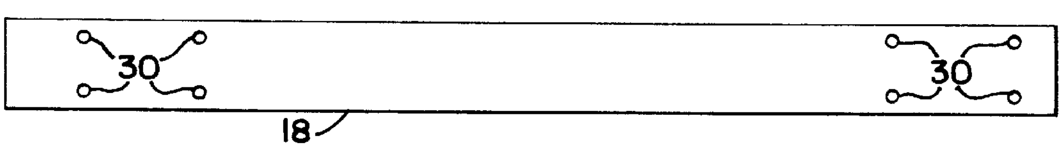
FIG. 10 is a bottom plan view thereof.

A series of wheels 28 are secured to each of the headers 18, 20 and 24. As represented in FIG. 10, each of the headers has a series of threaded holes 30 to which the wheels 28 are attached by appropriate screws or bolts (not illustrated). The wheels 28 are preferably caster wheels or the like so that the cart 10 can be readily maneuvered in any direction.

Figure 3:
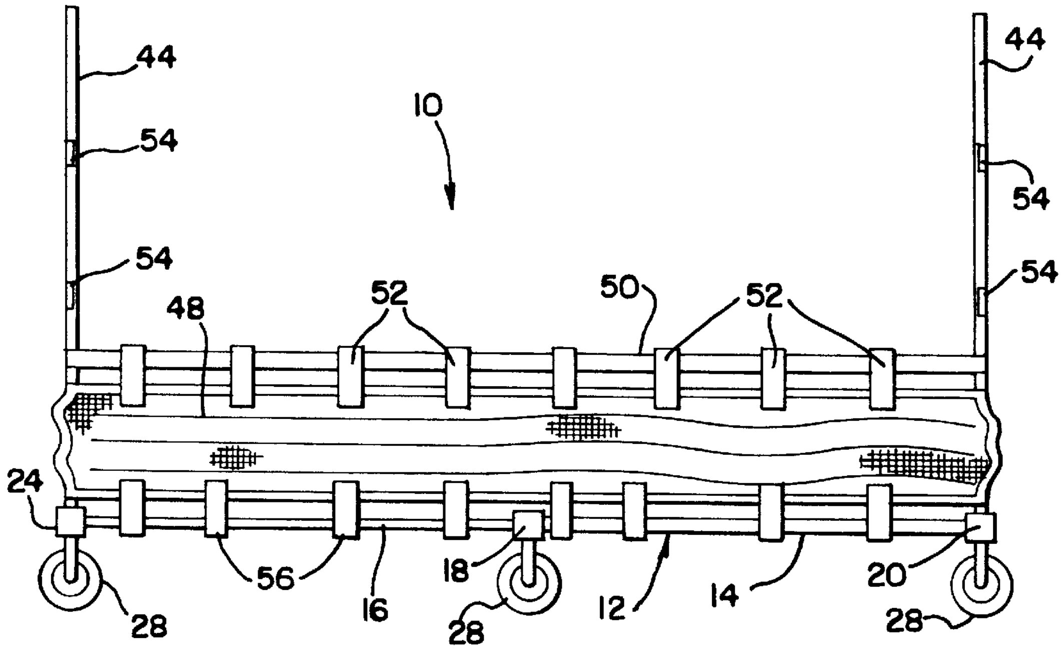
FIG. 3 is a reduced size side elevational view similar to FIG. 2, but having the flexible containment side lowered.
Figure 4:
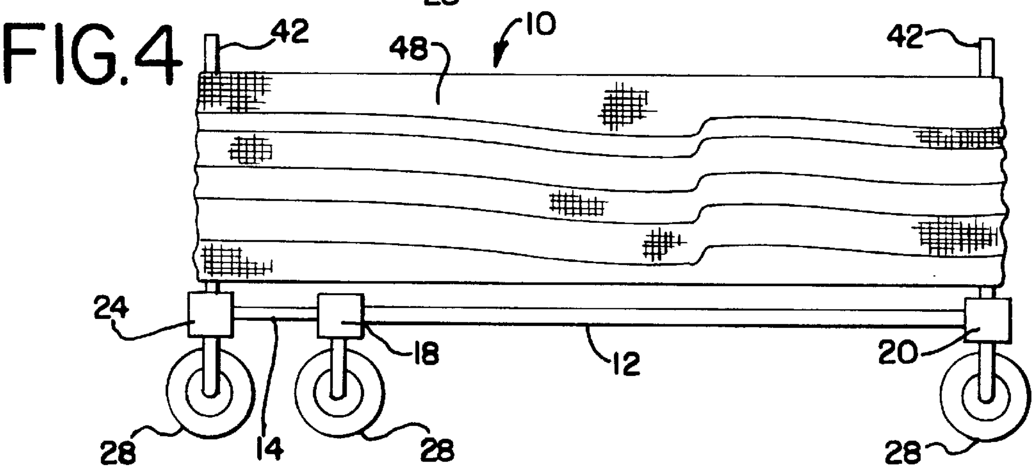
FIG. 4 is a view similar to FIG. 3, but with the handles removed and with the cart contracted in length.

As depicted in the drawing figures, the cart 10 is expandable to the extent of the lengths of the minor tubes 16. Thus, as shown in FIGS. 1 and 4, the cart 10 is fully retracted, but in FIGS. 2 and 3 the cart is fully expanded. To that end and to retain the cart at a particular desired length, at least one of, and preferably both of, the tube assemblies 12 on the opposite sides of the cart 10 are provided with means for retaining the tube assemblies at a plurality of telescopic extensions. As best illustrated in FIGS. 9 through 13, a radial aperture 32 extends through the end header 18 and each of the major tubes 14 on the opposite sides of the cart 10. The corresponding minor tubes 16 are provided with a plurality of spaced radial apertures 34. Removable pins 36 are provided to fit within the apertures 32 and through a selected one of the apertures 34, thus locking the minor tubes 16 in place within the major tubes 14 and defining a desired length of the cart 10. To prevent loss, each of the removable pins 36 can be attached to the end header 18 by an appropriate tether 38.

Figure 7:
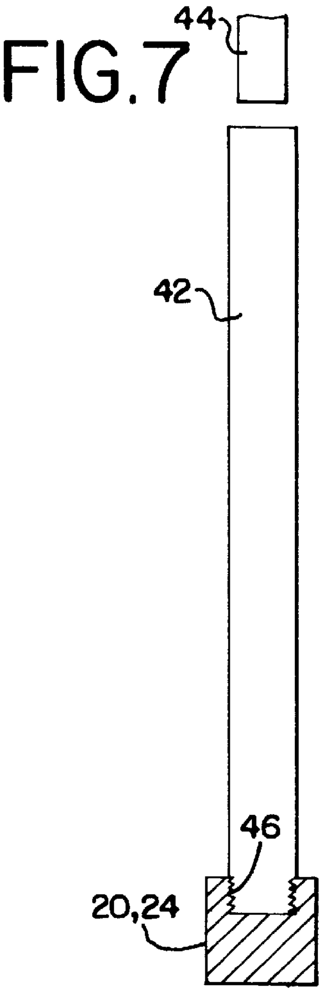
FIG. 7 is a fragmentary elevational view, partially in cross section, showing how the handle engages its receptacle which in turn is engaged in one of the header blocks.
Figure 8:
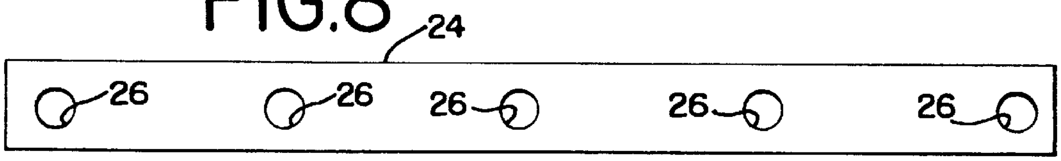
FIG. 8 is an elevational view of the single header block for the minor tubes.
Figure 9:
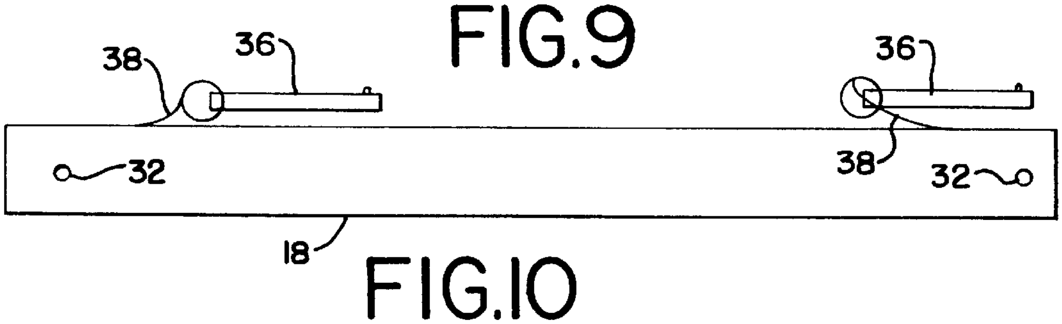
FIG. 9 is a top plan view of the header block for the major tubes.

The end headers 20 and 24 each carry opposite handle assemblies 40. Each handle assembly 40 is composed of a pair of handle receptacles 42 and a removable handle 44 extending therefrom. As best shown in FIG. 7, the handle receptacles 42 are preferably provided with threads 46 and are threadedly installed in corresponding apertures in the end headers 20 and 24. Other means of installation will be apparent to one skilled in the art.

The cart 10 includes flexible containment sides in the form of a material panel 48 which extends around the handle assemblies 40. The material panel 48 is suspended from a retainer strap 50 by means of a series of top loops 52. The retainer strap 50, in turn, extends about the periphery of the cart 10 and is appropriately secured to the handles 44, such as by means of a series of "Velcro" fasteners, comprising hook and loop elements, with the hook elements secured to one of the retainer strap 50 or the handle 44, and the loop elements secured to the other of the retainer strap 50 and the handle 44 in a very conventional fashion. As illustrated in some of the drawing figures, part of the hook and loop fastener 54 is shown adhering to the handle 44. Remaining portions (not illustrated) are located on the underside of retainer strap 50.

Figure 2:
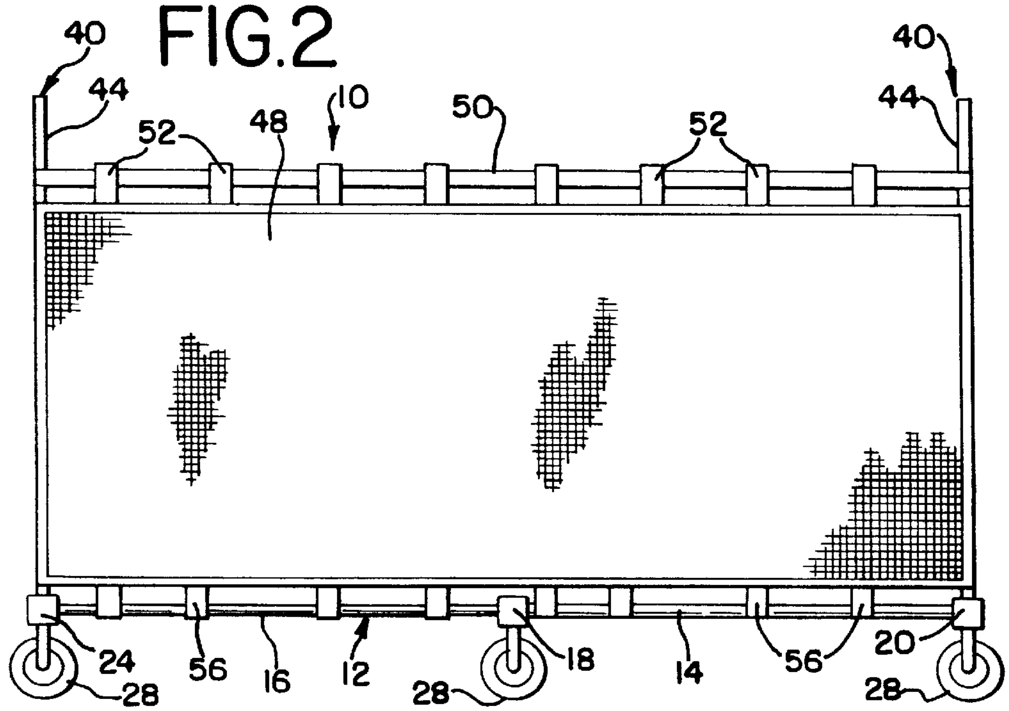
FIG. 2 is a side elevational view of the cart illustrated in FIG. 1, when fully expanded, and having the flexible containment side in its full upright orientation.

The material panel 48 is also secured to the outside tube assemblies 12 by means of bottom loops 56 extending over the respective major tubes 14 and minor tubes 16. Thus, as illustrated in FIG. 2, the material panel 48 can be fully extended in an upright orientation by fastening the retainer strap 50 as high as possible on the handles 44. Conversely, the material panel 48 can be lowered by simply releasing the retainer strap 50 from the hook and loop fasteners 54 and lowering the material panel 48 as illustrated, to permit easy access to the support formed by the series of tube assemblies 12.

The retainer strap 50 may be formed of a single element, or can be two or more parts. Since the cart 10 can be expanded or contracted in length, the retainer strap 50 must also be capable of being expanded or contracted in length. As the cart 10 is contracted in length, the material panel 48 is simply gathered on the retainer strap 50 and the telescoping minor tube 16 in a very conventional fashion, much like gathering of a curtain.

Figure 5:
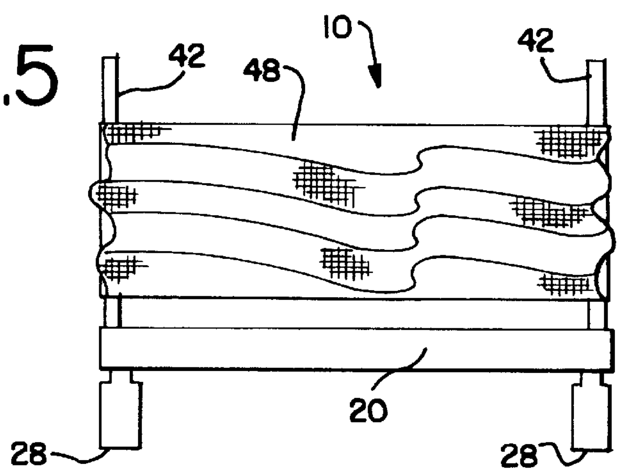
FIG. 5 is an end elevational view of the cart shown in FIG. 4.
Figure 6:
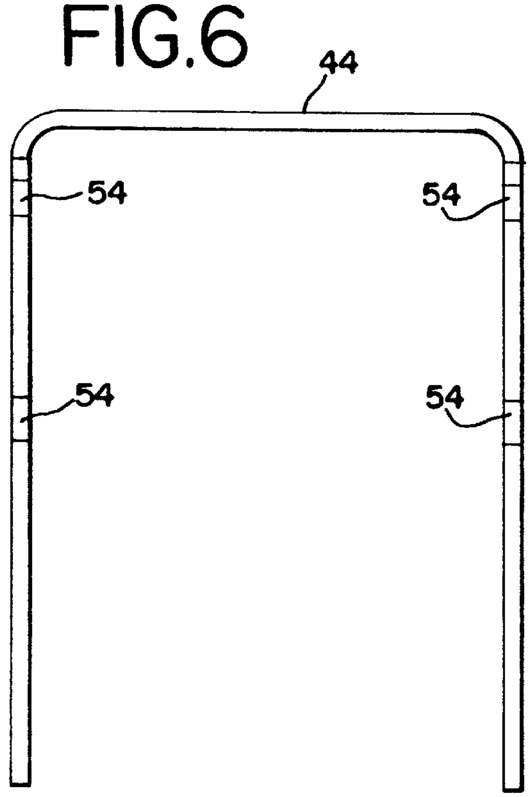
FIG. 6 is an elevational view of one of the handles of the handle assembly utilized in the expandable cart.

As will be evident, the material panel 48 forming the sides and ends of the cart 10 can be adjusted in height at practically an infinite number of positions. Preferably, the material panel 48 remains on the cart 10 when the handles 44 are removed, as illustrated in FIGS. 4 and 5.

Figure 14:
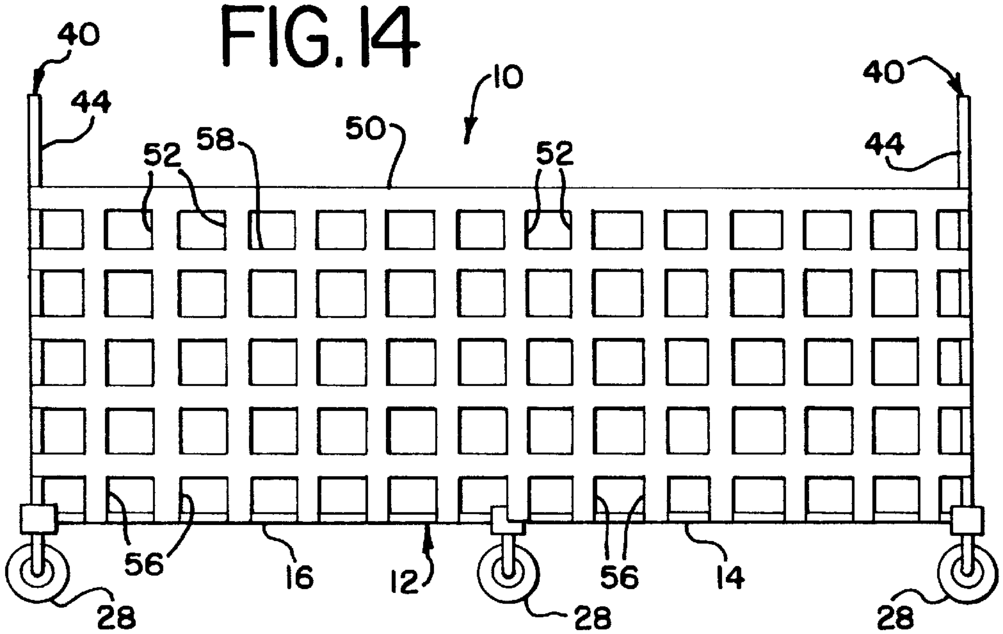
FIG. 14 is a side elevational illustration similar to FIG. 2, but of a modified form of the invention having open mesh containment sides.

FIG. 14 illustrates a modified version of the cart 10. All elements remain the same except that the material panel 48 of the first embodiment of the invention has been replaced by an open mesh panel 58. The panel 58 is suspended top and bottom by a series of loops 52 and 56 in precisely the same manner as the material panel 48, or can be otherwise suspended in any conventional fashion.

The cart 10 is expanded or contracted in a very simple manner. If the material panel 48 or open mesh panel 58 is not employed, changing the length of the cart 10 is accomplished by simply removing the pins 36 and adjusting the telescoping minor tubes 16 inwardly or outwardly from the major tubes 14, as desired, with the pins 36 then being replaced. If the material panels 48 or 58, or similar panels, are employed, in addition to removing the pins 36, the retainer strap 50 must also be lengthened or shortened and the panel gathered or payed out as the length of the cart 10 is adjusted.

Achievements

The invention provides a very versatile cart for use in a myriad of applications. Because a series of spaced tube assemblies 12 are employed with the minor tubes 16 telescoping in the major tubes 14, changing the length of the cart 10 is accomplished simply and quickly. No cross slats or other support panels need be applied or removed for supporting products to be carried by the cart 10.

Because the handles 4 are removable from the handle receptacles 42, and because the panels 48 and 58 can be readily raised and lowered, the cart 10 is adaptable to being placed underneath a sorting table or other similar structure having restricted clearance. Items can be placed on the cart 10 when in that orientation, and the cart can then be easily maneuvered on the caster wheels 28, the handles 44 can be replaced and the cart can then be transported wherever required.

Because of the rigid bearing structure formed by the tube assemblies 12 extending in and from the end headers 18, 20 and 24, the cart 10 can carry a substantial amount of weight. The support provided by the tube assemblies 12 is generally flat, allowing easy stacking of items on the cart 10.

Various changes can be made to the invention without departing from the spirit thereof or scope of the following claims.

What is claimed is:

1. An expandable cart, comprising a. a plurality of parallel, telescoping tube assemblies, each tube assembly comprising a major tube and a minor tube with said minor tube telescopically extending within said major tube, a pair of said tube assemblies comprising opposite sides of the cart, and at least one further tube assembly being a center support located between said opposite sides, b. a pair of end headers maintaining said major tubes in a spaced relationship, one end header being located at one end of said major tubes and the other of said end headers being located at an opposite end of said major tubes, c. a third end header maintaining said minor tubes in a spaced relationship with said minor tubes in registration with said major tubes, said minor tubes being mounted at one end in the third end header and having free ends extending into said major tubes, d. a series of wheels mounted beneath said tube assemblies on said headers, said wheels supporting the cart and providing mobility, and e. means for facilitating movement of the cart.

2. An expandable cart according to claim 1 including flexible containment sides.

3. An expandable cart according to claim 2 including four corner posts, and in which said flexible containment sides comprise a material panel extending about said corner posts.

4. An expandable cart according to claim 3 including means mounting said material panel about said corner posts.

5. An expandable cart according to claim 4 in which said mounting means includes a retainer strap, said material panel being suspended from said retainer strap.

6. An expandable cart according to claim 5 in which said retainer strap is adjustable.

7. An expandable cart according to claim 1 in which said means for facilitating movement comprises a removable handle assembly at each end of the cart.

8. An expandable cart according to claim 7 in which each handle assembly includes two handle receptacles at each end of the cart and a removable handle extending from said handle receptacles.

9. An expandable cart, comprising a. a plurality of parallel, telescoping tube assemblies, each tube assembly comprising a major tube and a minor tube with said minor tube telescopically extending within said major tube, a pair of said tube assemblies comprising opposite sides of the cart, and at least one further tube assembly being a support located between said opposite sides, b. an end header at each end of said major tubes, said major tubes being mounted in said end headers in a spaced relationship, c. a third end header at one end of said minor tubes, said minor tubes being mounted in said third end header in a spaced relationship with said minor tubes being in registration with and extending into said major tubes, d. a series of wheels mounted beneath said end headers, said wheels supporting the cart and providing mobility, e. means for facilitating movement of the cart, and f. flexible containment sides mounted on the cart.

10. An expandable cart according to claim 9 in which said means for facilitating movement comprises a removable handle assembly at each end of the cart, one of said handle assemblies being secured to one of said end headers for said major tubes and the other of said handle assemblies being secured to said end header for said minor tubes.

11. An expandable cart according to claim 10 in which each handle assembly includes two handle receptacles secured to a said end header and a removable handle extending from said handle receptacles.

12. An expandable cart according to claim 9 including four corner posts, and in which said flexible containment sides comprise a material panel extending about said corner posts.

13. An expandable cart according to claim 12 including a retainer strap extending about corner posts, said material panel being suspended from said retainer strap.

14. An expandable cart according to claim 13 in which said retainer strap includes a fixed portion and an adjustable portion.

15. An expandable cart according to claim 9 including means for retaining said tube assemblies at a plurality of telescopic extensions.

16. An expandable cart according to claim 15 in which said retaining means comprises a first radial aperture through at least one of said major tubes at one end thereof, a plurality of spaced second radial apertures in the minor tube extending within said at least one major tube, and a removable pin passing though said first radial aperture and one of said second radial apertures when said one of said second radial apertures is in registration with said first radial aperture.

17. An expandable cart according to claim 9 including at least five of said parallel tube assemblies.

* * * * *